United States Patent
Ochiai et al.

(10) Patent No.: US 7,102,330 B2
(45) Date of Patent: Sep. 5, 2006

(54) APPARATUS AND METHOD FOR CONTROLLING CHARGING AND DISCHARGING OF AN ENERGY STORAGE DEVICE

(75) Inventors: Shinobu Ochiai, Utsunomiya (JP); Kiyoshi Asami, Utsunomiya (JP); Tomohiro Shiraishi, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 282 days.

(21) Appl. No.: 10/848,005

(22) Filed: May 19, 2004

(65) Prior Publication Data
US 2004/0232883 A1  Nov. 25, 2004

(30) Foreign Application Priority Data
May 21, 2003  (JP) ............................. 2003-143405

(51) Int. Cl.
*H02J 7/00* (2006.01)
(52) U.S. Cl. ................................. 320/132
(58) Field of Classification Search ............... 320/132, 320/128, 116; 324/427; 702/63
See application file for complete search history.

(56) References Cited

U.S. PATENT DOCUMENTS 6,072,300 A * 6/2000 Tsuji ......................... 320/116
6,160,380 A * 12/2000 Tsuji et al. ................. 320/132
6,642,719 B1 * 11/2003 Seto ........................... 324/427
6,932,174 B1 * 8/2005 Hirata et al. ................ 180/65.2
6,947,855 B1 * 9/2005 Verbrugge et al. ............ 702/63

FOREIGN PATENT DOCUMENTS

JP  9-215111  8/1997
JP  9-312901  12/1997

* cited by examiner

*Primary Examiner*—Pia Tibbits
(74) *Attorney, Agent, or Firm*—Westerman, Hattori, Daniels & Adrian, LLP

(57) ABSTRACT

An apparatus and method for controlling charging and discharging of an energy storage device. If the charging voltage that is applied exceeds a restriction determining voltage, the power value at that time is held as the charging power upper limit value. In addition, by multiplying a restriction coefficient by the charging power upper limit value while gradually reducing the restriction coefficient until the voltage drops below a restriction removal determining voltage. By setting its result as a control target value of the charging power, the charging power is gradually restricted. In contrast, if the applied charging voltage drops below the restriction removal determining voltage, the charging power is conversely gradually restored to its original state using a control target value obtained by multiplying the restriction coefficient by the charging power upper limit value while gradually increasing the restriction coefficient until the voltage equals or goes above the restriction determining voltage.

10 Claims, 4 Drawing Sheets

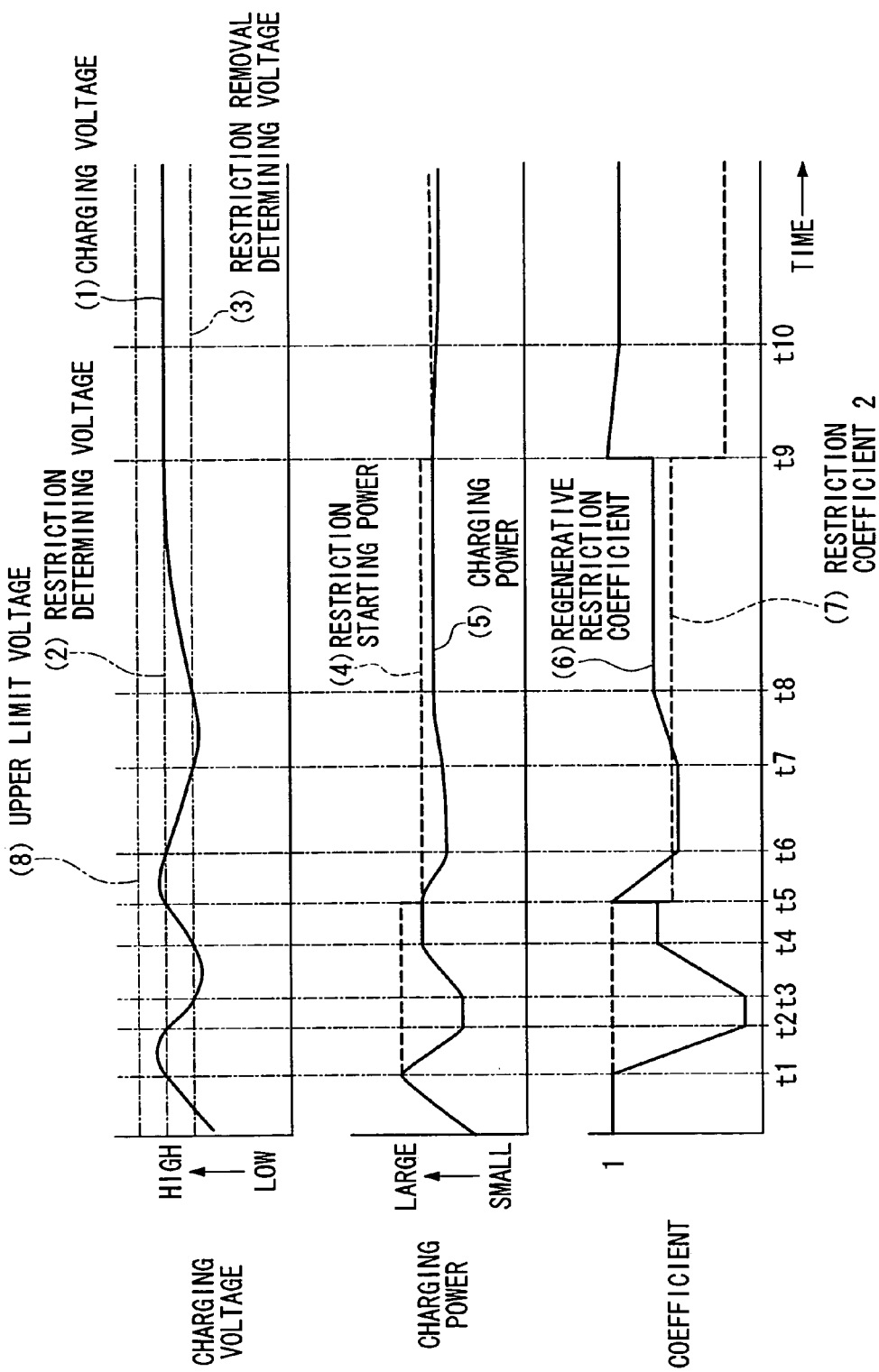

APPARATUS AND METHOD FOR CONTROLLING CHARGING AND DISCHARGING OF AN ENERGY STORAGE DEVICE

BACKGROUND OF THE INVENTION

1. Field of the Invention

The present invention relates to a charging and discharging control apparatus that controls the charging and discharging of an energy storage device, and to a method for controlling the charging and discharging of an energy storage device.

Priority is claimed on Japanese Patent Application No. 2003-143405, filed May 21, 2003, the contents of which are incorporated herein by reference.

2. Description of Related Art

Conventionally, in vehicles that run using an electric motor such as electric vehicles (EV) and hybrid electric vehicles (HEV), there are cases in which, depending on the running state of the vehicle, the power required cannot be obtained from an energy storage device such as a battery or capacitor mounted in the vehicle. Because of this, an apparatus is used that controls the discharging power and charging power (i.e., the regenerative power) such that the terminal voltage of the energy storage device does not rise above a maximum allowable voltage or drop below a discharge final voltage.

Specifically, this apparatus measures voltage between terminals of an energy storage device that is mounted in a vehicle, and if this voltage drops below a reference voltage amends the maximum discharge power using a restriction coefficient so as to limit the output of power output from the energy storage apparatus. On the other hand, if the voltage between terminals of the energy storage device rises above a reference voltage, the apparatus corrects the maximum charging power using a restriction coefficient so as to limit the charging power that is input into the energy storage device (see, for example, Japanese Patent Application Unexamined Publication No. 09-215111 (paragraph 0031 and FIG. 17) and No. 09-312901 (paragraph 0034 and FIG. 21).

SUMMARY OF THE INVENTION

However, in a conventional apparatus, because the target power and the control width of the power by the restriction coefficient are only controlled mono-tonally and also mono-directionally, if, for example, this control apparatus is used for a variety of energy storage devices having different reactions such as batteries and nickel hydrogen batteries, then the problem arises that man hours are required as it is necessary to set the control width and target power precisely to correspond to each energy storage device. In addition, because the reaction in each energy storage device is different for charging or discharging depending on the quantity of the charging power, the problems arise that there is a possibility of hunting being generated in the output voltage during the control due to the relationship between the control width and target power and also the control delay, and also that there is a possibility that convergence of the discharging and charging control will be delayed so that the output voltage will become unstable.

As a result, the problem arises that it becomes difficult to control the discharging power and charging power (i.e., the regenerative power) of the energy storage device such that the terminal voltage of the energy storage device does not rise above a maximum allowable voltage or does not drop below a discharging final voltage. In addition, the problem arises that if torque variations in the motor that is connected as a load give unpleasant sensations to an occupant of the vehicle then the marketability of the vehicle is deteriorated.

The present invention has been made in view of the above circumstances and it is an object thereof to provide a charging and discharging control apparatus and a charging and discharging control method that enable the discharging power and charging power of an energy storage device to be suitably controlled.

In order to solve the above problems, in accordance with an aspect of the present invention, there is provided a charging and discharging control apparatus that controls charging and discharging of an energy storage device (for example, the energy storage device 2 of the embodiments) by a load (for example, the motor 1 and PDU 3 of the embodiments) that is connected to the energy storage device, comprising: an upper limit power setting device (for example, step S118 through step S28 of the embodiments) that, when a charging voltage that is applied to the energy storage device exceeds a restriction determining voltage that is set in order to start a restriction of charging power to the energy storage device, sets a charging power value at that point as an upper limit power value for the charging power; a power restricting device (for example, step S29 through step S37 of the embodiments) that multiplies a restriction coefficient by the upper limit power value while gradually reducing the restriction coefficient using a predetermined reduction width until the charging voltage drops below the restriction determining voltage, and, by setting a result thereof in the load as a control target value of the charging power, restricts the charging power; and a restriction removal device (for example, step S1 through step S17 of the embodiments) that, when the charging voltage drops below a restriction removal determining voltage that is set in order to remove a restriction on the charging power, multiplies the restriction coefficient by the upper limit power value while gradually increasing the restriction coefficient using a predetermined increase width, and, by setting a result thereof in the load as a control target value of the charging power, removes the restriction on the charging power, wherein the reduction width of the restriction coefficient in the power restricting device is set to be larger than the increase width of the restriction coefficient in the restriction removal device.

With the charging and discharging control apparatus having the above described structure, if the charging voltage that is applied to an energy storage device exceeds the restriction determining voltage that is set as a reference point for starting restricting the charging power to the energy storage device, the upper limit power setting device stores the charging power value at that point in time as the upper limit power value of the charging power. Then, the power restricting device multiplies the restriction coefficient by the stored upper limit power value while gradually reducing the restriction coefficient, and, by setting the result of this in the load as the control target value of the charging power, controls the load such that the charging voltage that is applied to the energy storage device is gradually reduced. In contrast, if the charging voltage that is applied to the energy storage device drops below the restriction removal determining voltage that is set as a reference point for removing the restriction on the charging power, the restriction removal device multiplies the restriction coefficient by the stored upper limit power value while gradually increasing the restriction coefficient, and, by setting the result of this in the load as the control target value of the charging power, controls the load such that the charging voltage that is applied to the energy storage device is gradually increased.

Consequently, by setting the reduction width at which the power control device gradually reduces the restriction coefficient larger than the increase width at which the restriction removal device gradually increases the restriction coefficient, if the charging voltage that is applied to the energy storage device exceeds the restriction determining voltage, the charging power is promptly limited and the charging voltage is reduced at a suitable speed. If the charging voltage drops too much, the charging power is restored at a slower speed than when it dropped, enabling the convergence of the charging voltage to be accelerated.

Preferably, in the charging and discharging control apparatus having the above described structure, if the charging voltage again exceeds the restriction determining voltage, the upper limit power setting device updates the upper limit power value if the charging power value at this time is smaller than the upper limit power value that is stored.

In the charging and discharging control apparatus having the above described structure, as the consequence of the updated upper limit power value gradually becomes smaller, when the restriction coefficient and the updated upper limit power value are multiplied together, then even if the width of the change in the restriction coefficient is the same, because the change in the control target value of the charging power that is calculated becomes smaller, convergence of the charging voltage is accelerated further.

Preferably, in the charging and discharging control apparatus having the above described structure, if the charging voltage again exceeds the restriction determining voltage, the power restricting device makes the reduction width of the restriction coefficient that is set at this time smaller than the reduction width of the restriction coefficient that was set when the charging voltage previously exceeded the restriction determining voltage.

In the charging and discharging control apparatus having the above described structure, as the consequence of the reduction width of the restriction coefficient gradually becomes smaller each time the charging voltage once again exceeds the restriction determining voltage, when the restriction coefficient and the upper limit power value are multiplied together, then even if there is no change in the upper limit power value, because the change in the control target value of the charging power that is calculated becomes smaller, convergence of the charging voltage is accelerated further.

Preferably, in the charging and discharging control apparatus having the above described structure, if the charging voltage again drops below the restriction removal determining voltage, the restriction removal device makes the increase width of the restriction coefficient that is set at this time smaller than the increase width of the restriction coefficient that was set when the charging voltage previously dropped below the restriction removal determining voltage.

In the charging and discharging control apparatus having the above described structure, as the consequence of the increase width of the restriction coefficient gradually becomes smaller each time the charging voltage once again drops below the restriction removal determining voltage, when the restriction coefficient and the upper limit power value are multiplied together, then even if there is no change in the upper limit power value, because the change in the control target value of the charging power that is calculated becomes smaller, convergence of the charging voltage is accelerated further.

According to another aspect of the present invention, there is provided a charging and discharging control apparatus that controls charging and discharging of an energy storage device by a load that is connected to the energy storage device, comprising: an upper limit power setting device that, when a discharging voltage that is output from the energy storage device drops below a restriction determining voltage that is set in order to start a restriction of discharging power from the energy storage device, sets a discharging power value at that point as an upper limit power value for the discharging power; a power restricting device that multiplies a restriction coefficient by the upper limit power value while gradually reducing the restriction coefficient using a predetermined reduction width until the discharging voltage goes above the restriction determining voltage, and, by setting a result thereof in the load as a control target value of the discharging power, restricts the discharging power; and a restriction removal device that, when the discharging voltage goes above a restriction removal determining voltage that is set in order to remove a restriction on the discharging power, multiplies the restriction coefficient by the upper limit power value while gradually increasing the restriction coefficient using a predetermined increase width, and, by setting a result thereof in the load as a control target value of the discharging power, removes the restriction on the discharging power, wherein the reduction width of the restriction coefficient in the power restricting device is set to be larger than the increase width of the restriction coefficient in the restriction removal device.

With the charging and discharging control apparatus having the above described structure, if the discharging voltage that is output from the energy storage device drops below the restriction determining voltage that is set as a reference point for starting restricting the discharging power from the energy storage device, the upper limit power setting device stores the discharging power value at that point in time as the upper limit power value of the discharging power discharged from the energy storage device. Then, the power restricting device multiplies the restriction coefficient by the stored upper limit power value while gradually reducing the restriction coefficient, and, by setting the result of this for the load as a control target value of the discharging power, controls the load such that the discharging voltage that is output from the energy storage device is gradually reduced. In contrast, if the discharging voltage from the energy storage device goes above the restriction removal determining voltage that is set as a reference point for removing the restriction on the discharging power, the restriction removal device multiplies the restriction coefficient by the stored upper limit power value while gradually increasing the restriction coefficient, and, by setting the result of this in the load as a control target value of the discharging power, controls the load such that the discharging voltage that is output from the energy storage device is gradually increased.

Therefore, by setting the reduction width at which the power control device gradually reduces the restriction coefficient so as to be larger than the increase width at which the restriction removal device gradually increases the restriction coefficient, if the discharging voltage that is output from the energy storage device drops below the restriction determining voltage, the discharging power is promptly limited and the discharging voltage is increased at a suitable speed. If the discharging voltage increases too much, the discharging power is restored more gradually than when it was raised, enabling the convergence of the discharging voltage to be accelerated.

Preferably, in the charging and discharging control apparatus having the above described structure, if the discharging voltage again drops below the restriction determining voltage, the upper limit power setting device updates the upper limit power value if the discharging power value at this time is smaller than the upper limit power value that is stored.

In the charging and discharging control apparatus having the above described structure, as the consequence of the updated upper limit power value gradually becomes smaller, when the restriction coefficient and the updated upper limit power value are multiplied together, then even if the width of the change in the restriction coefficient is the same, because the change in the control target value of the discharging power that is calculated becomes smaller, convergence of the discharging voltage is accelerated further.

Preferably, in the charging and discharging control apparatus having the above described structure, if the discharging voltage again drops below the restriction determining voltage, the power restricting device makes the reduction width of the restriction coefficient that is set at this time smaller than the reduction width of the restriction coefficient that was set when the discharging voltage previously dropped below the restriction determining voltage.

In the charging and discharging control apparatus having the above described structure, as the consequence of the reduction width of the restriction coefficient gradually becomes smaller each time the discharging voltage once again drops below the restriction determining voltage, when the restriction coefficient and the upper limit power value are multiplied together, then even if there is no change in the upper limit power value, because the change in the control target value of the discharging power that is calculated becomes smaller, convergence of the discharging voltage is accelerated further.

Preferably, in the charging and discharging control apparatus having the above described structure, if the discharging voltage again exceeds the restriction removal determining voltage, the restriction removal device makes the increase width of the restriction coefficient that is set at this time smaller than the increase width of the restriction coefficient that was set when the discharging voltage previously exceeded the restriction removal determining voltage.

In the charging and discharging control apparatus having the above described structure, as the consequence of the increase width of the restriction coefficient gradually becomes smaller each time the discharging voltage once again exceeds the restriction removal determining voltage, when the restriction coefficient and the upper limit power value are multiplied together, then even if there is no change in the upper limit power value, because the change in the control target value of the discharging power that is calculated becomes smaller, convergence of the discharging voltage is accelerated further.

According to still another aspect of the present invention, there is provided a charging and discharging control method for controlling charging and discharging of an energy storage device by a load that is connected to the energy storage device, comprising: upper limit power setting processing in which, when a charging voltage that is applied to the energy storage device exceeds a restriction determining voltage that is set in order to start a restriction of charging power to the energy storage device, a charging power value at that point is set as an upper limit power value for the charging power; power restricting processing in which a restriction coefficient is multiplied by the upper limit power value while the restriction coefficient is gradually reduced using a predetermined reduction width until the charging voltage drops below the restriction determining voltage, and a result thereof is set in the load as a control target value of the charging power, so as to restrict the charging power; and restriction removal processing in which, when the charging voltage drops below a restriction removal determining voltage that is set in order to remove a restriction on the charging power, the restriction coefficient is multiplied by the upper limit power value while the restriction coefficient is gradually increased using a predetermined increase width, and a result thereof is set in the load as a control target value of the charging power, so as to remove the restriction on the charging power, wherein the reduction width of the restriction coefficient in the power restricting processing is set to be larger than the increase width of the restriction coefficient in the restriction removal processing.

According to a still another aspect of the present invention, there is provided a charging and discharging control method for controlling charging and discharging of an energy storage device by a load that is connected to the energy storage device, comprising: upper limit power setting processing in which, when a discharging voltage that is output from the energy storage device drops below a restriction determining voltage that is set in order to start a restriction of discharging power from the energy storage device, a discharging power value at that point is set as an upper limit power value for the discharging power; power restricting processing in which a restriction coefficient is multiplied by the upper limit power value while the restriction coefficient is gradually reduced using a predetermined reduction width until the discharging voltage goes above the restriction determining voltage, and a result thereof is set in the load as a control target value of the discharging power, so as to restrict the discharging power; and restriction removal processing in which, when the discharging voltage goes above a restriction removal determining voltage that is set in order to remove a restriction on the discharging power, the restriction coefficient is multiplied by the upper limit power value while the restriction coefficient is gradually increased using a predetermined increase width, and a result thereof is set in the load as a control target value of the discharging power, so as to remove the restriction on the discharging power, wherein the reduction width of the restriction coefficient in the power restricting processing is set to be larger than the increase width of the restriction coefficient in the restriction removal processing.

BRIEF DESCRIPTION THE DRAWINGS

FIG. 4 is a waveform diagram showing an example of the charging control of an energy storage device.

DETAILED DESCRIPTION OF THE INVENTION

An embodiment of the present invention will now be described with reference made to the drawings.

Figure 1:
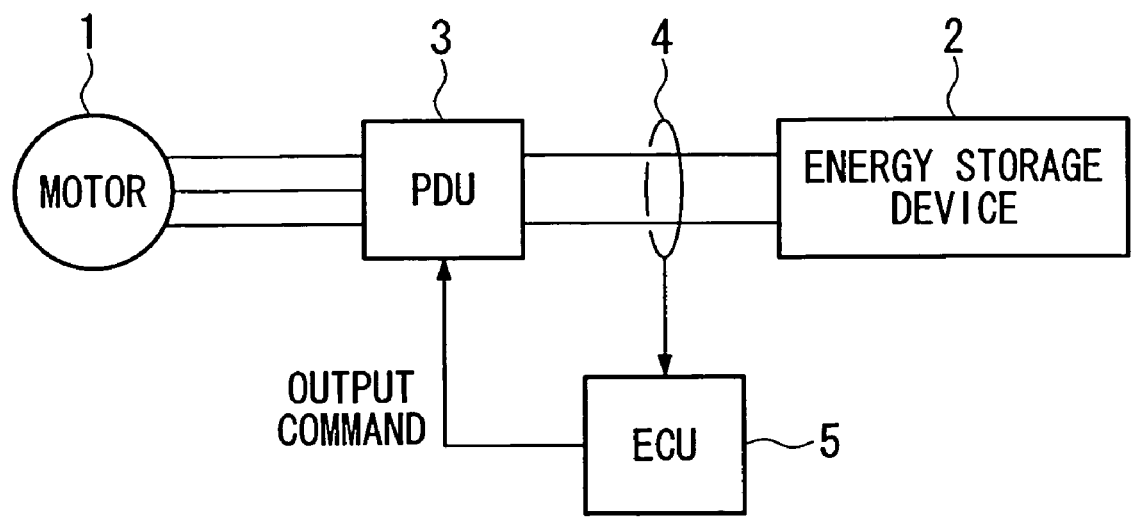
FIG. 1 is a block diagram showing the structure of a vehicle running system that is provided with the charging and discharging control apparatus of an embodiment of the present invention.

FIG. 1 is a block diagram showing the structure of a vehicle running system that is provided with the charging and discharging control apparatus of an embodiment of the present invention.

In FIG. 1, a motor 1 is provided with, for example, three coils and is a three phase electric motor that is mounted in a vehicle and either supplements an engine that drives the vehicle to run or has a rotor that is connected to a drive apparatus (not shown) of the vehicle so as to drive the vehicle to run. A power drive unit (PDU) 3 that is formed mainly by an inverter circuit is connected to the motor 1. This PDU 3 obtains DC power from an energy storage device 2, which is an energy storage device including batteries and capacitors and the like mounted in the vehicle, converts this DC power into three phase AC power and drives the motor 1 or, alternatively, converts regenerative power of the motor 1 into DC power and charges the energy storage device 2.

A voltage sensor 4 that detects a voltage between terminals of the energy storage device 2 is provided on power supply lines that connect the energy storage device 2 with the PDU 3 and that exchange power between the energy storage device 2 and the PDU 3. Based on the voltage between the terminals of the energy storage device 2 that is detected by the voltage sensor 4, control for discharging and charging the energy storage device 2 for the PDU 3 is performed by an electronic control unit (ECU) 5 that is provided with a central processing unit (CPU) that controls overall operations of the charging and discharging control apparatus of the present embodiment.

The ECU 5 is provided with an A/D conversion circuit that converts analog signals input from the voltage sensor 4 into digital signals, random access memory (RAM) that the CPU uses in order to store data during calculations, and read only memory (ROM) that stores programs that are executed by the CPU, tables, and maps, and the like.

(Charging Control)

Next, the charging and discharging control of the energy storage device 2 by the ECU 5 of the charging and discharging control apparatus of the present embodiment will be described. Note that, here, as an example, the charging control of the energy storage device 2 that is executed by the ECU 5 for the PDU 3 based on a charge voltage applied to the energy storage device 2 that is detected by the voltage sensor 4 is described with reference made to the drawings.

In the description of the charging control given below, the voltage between terminals of the energy storage device 2 that is generated when current is flowing to the energy storage device 2 is made the charging voltage applied to the energy storage device 2. In addition, the power from the current and charging voltage is handled as positive power and this is used as the charging power.

Figure 2:
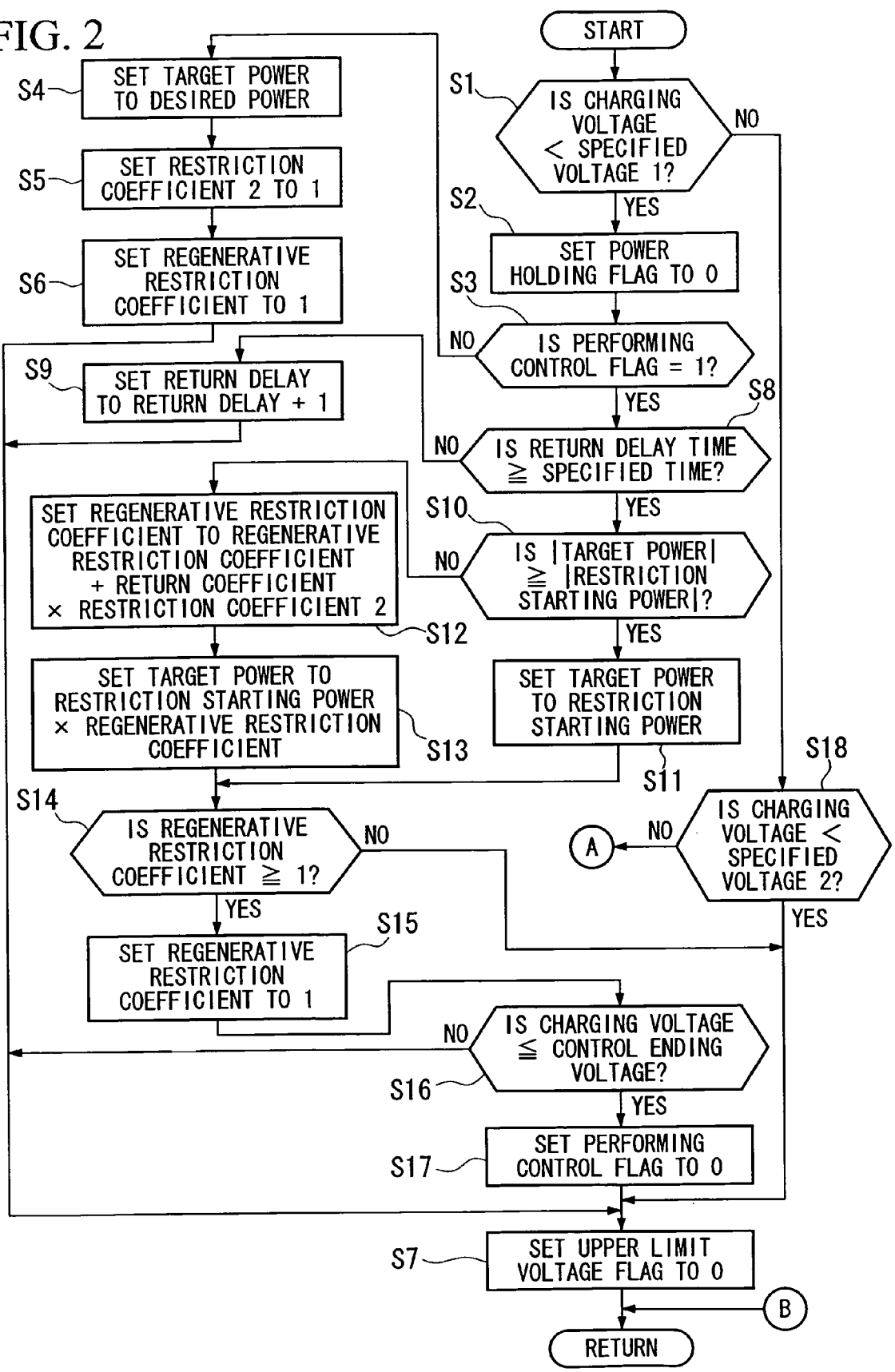
FIG. 2 is a flow chart showing a charging control operation by the charging and discharging control apparatus of the same embodiment.
Figure 3:
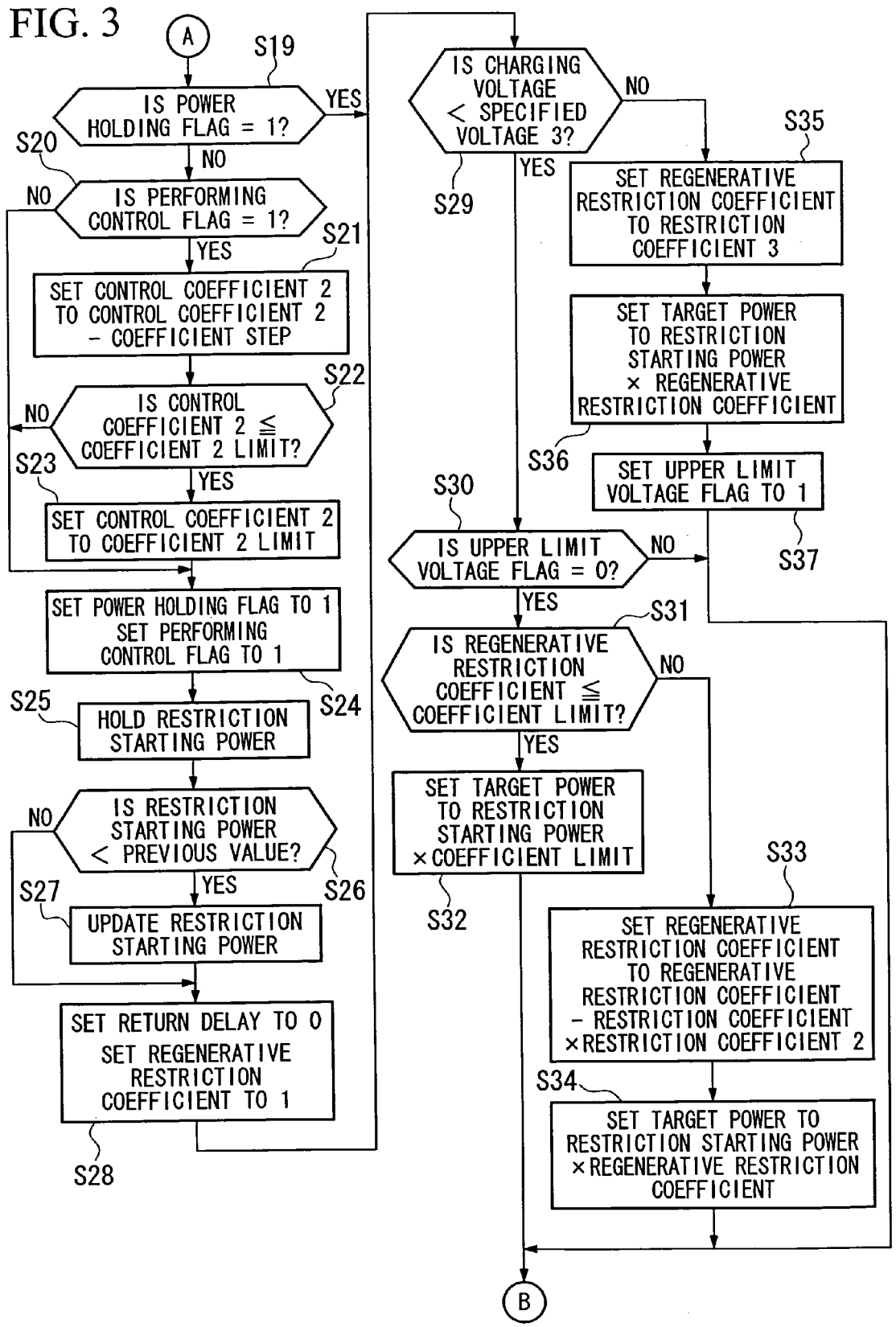
FIG. 3 is a flow chart showing a charging control operation by the charging and discharging control apparatus of the same embodiment.

FIGS. 2 and 3 are flow charts showing a charging control operation by the ECU 5 of the charging and discharging control apparatus of the present embodiment. Note that the charging control operation is executed at a predetermined interval.

In FIG. 2, firstly, the ECU 5 determines whether or not the charging voltage applied to the energy storage device 2 that is detected by the voltage sensor 4 is smaller than a specified voltage 1 (i.e., a restriction removal determining voltage) (step S1).

In step S1, if the charging voltage applied to the energy storage device 2 is smaller than the specified voltage 1 (i.e., the restriction removal determining voltage) (i.e., if the determination in step S1 is YES), the ECU 5 sets a power holding flag to "0" (step S2).

Note that the power holding flag is a flag that shows whether or not it is necessary to again store a new restriction starting power. If "0" is set for the power holding flag, this shows that it is necessary to once more store a new restriction starting power. If "1" is set for the power holding flag, this shows that it is not necessary to once more store a new restriction starting power.

This restriction starting power is the value of the charging power when control of the charging power is started and is stored when the control of the charging power is started.

Next, the ECU 5 determines whether or not a performing control flag is "1" in order to determine whether or not the charging power is currently being controlled (step S3). Note that this performing control flag is a flag that shows whether or not control of the charging power is currently being performed. If the performing control flag is "1", this shows that the charging power is currently being controlled, while if the performing control flag is "0", this shows that the charging power is not currently being controlled.

In step S3, if the performing control flag is "0" (i.e., if the determination in step S3 is NO), the ECU 5 sets the required power value that is necessary in order to charge the energy storage device 2 to a target power value (step S4), and sets a restriction coefficient 2 (i.e., a coefficient 2) to "1" (step S5). The regenerative restriction coefficient is also set to "1" (step S6).

Next, the upper limit voltage flag is set to "0" (step S7) and a single charging control operation is ended.

If, however, in step S3, the performing control flag is "1" (i.e., if the determination in step S3 is YES), the ECU 5 determines whether or not a return delay time is greater than a specified time (step S8) in order to determine whether or not the charging voltage applied to the energy storage device 2 is lower than a specified voltage 1 (i.e., the restriction removal determining voltage) for a set length of time.

In step S8, if the return delay time is shorter than the specified time (i.e., if the determination in step S8 is NO), the ECU 5 increases the return delay time by "1" (step S9), and then moves to step S7 and sets the upper limit voltage flag to "0" (step S7). As a result, a single charging control operation is ended. Note that the return delay time shows the time that the charging voltage applied to the energy storage device 2 is lower than the specified voltage 1 (i.e. the restriction removal determining voltage).

In step S8, if, however, the return delay time is greater than the specified time (i.e., if the determination in step S8 is YES), the ECU 5 determines whether or not the absolute value of the target power is greater than the absolute value of the restriction starting power (step S10). Note that, as is described above, the restriction starting power is the value of the charging power when control of the charging power is started and is stored when the control of the charging power is started.

In step S10, if the absolute value of the target power is equal to or greater than an absolute value of the restriction starting power (i.e., if the determination in step S10 is YES), the ECU 5 sets the restriction starting power as the value of the target power (step S11).

Moreover, in step S10, if the absolute value of the target power is less than the absolute value of the restriction starting power (i.e., if the determination in step S10 is NO), the ECU 5 firstly updates the regenerative restriction coefficient by adding a value obtained by multiplying the return coefficient (i.e., coefficient 4) by the restriction coefficient (i.e., coefficient 2) to the current regenerative restriction coefficient so as to obtain a new regenerative restriction coefficient (step S12).

Next, using the updated regenerative restriction coefficient, the target power is updated to a value obtained by multiplying the restriction starting power by the regenerative restriction coefficient (step S13).

Once the target power has been set in step S11 or step S13, the ECU 5 determines whether or not the regenerative restriction coefficient is equal to or greater than "1" (step S14).

If, in step S14, the regenerative restriction coefficient is equal to or greater than "1" (i.e., if the determination in step S14 is YES), the regenerative restriction coefficient is set to "1" (step S15).

Next, it is determined whether or not the charging voltage applied to the energy storage device 2 is equal to or less than a control ending voltage (step S16). If the charging voltage applied to the energy storage device 2 is equal to or less than a control ending voltage (i.e., if the determination in step S16 is YES), the ECU 5 sets the performing control flag to "0" (step S17).

The routine then moves to step S7 where the upper limit voltage flag is set to "0" (step S17) and a single charging control operation is ended.

Note that the control ending voltage is a voltage that is higher than an open circuit voltage by the amount of a particular margin and that is specified by adding this margin to the open circuit voltage of the energy storage device 2. The control ending voltage is used as material for determining whether to end the control of the charging power. When the charging voltage that is applied to the energy storage device 2 is equal to or less than the control ending voltage, the ECU 5 ends the charging power control.

If, however, in step S14, the regenerative restriction coefficient is less than "1" (i.e., if the determination in step S14 is NO), or if, in step S16, the charging voltage that is applied to the energy storage device 2 is not equal to or less than the control ending voltage (i.e., if the determination in step S16 is NO), the ECU 5 moves to step S7 without taking any further action and sets the upper limit voltage flag to "0" (step S7) and a single charging control operation is ended.

If, in step S1, the charging voltage that is applied to the energy storage device 2 is equal to or more than the specified voltage 1 (i.e., the restriction removal determining voltage) (i.e., if the determination in step S1 is NO), the ECU 5 determines whether or not the charging voltage that is applied to the energy storage device 2 is smaller than the specified voltage 2 (i.e., the restriction determining voltage) (step S18).

If, in step S18, the charging voltage that is applied to the energy storage device 2 is less than the specified voltage 2 (i.e., the restriction determining voltage) (i.e., if the determination in step S18 is YES), the ECU 5 moves to step S7 without taking any further action and sets the upper limit voltage flag to "0" (step S7) and a single charging control operation is ended.

If, however, in step S18, the charging voltage that is applied to the energy storage device 2 is equal to or more than the specified voltage 2 (i.e., the restriction determining voltage) (i.e., if the determination in step S18 is NO), the ECU 5 moves to step S19 shown in FIG. 3, and determines whether or not the power holding flag is "1" (step S19).

If the power holding flag is "0" (i.e., if the determination in step S19 is NO), the ECU 5 determines whether or not the performing control flag is "1" (step S20) in order to determine whether or not control of the charging power is currently being performed.

In step S20, if the performing control flag is "1" (i.e., if the determination in step S20 is YES), the ECU 5 updates the restriction coefficient 2 (step S21) to a new restriction coefficient 2 (i.e., the coefficient 2) by subtracting the coefficient step from the restriction coefficient 2 (i.e., the coefficient 2). Note that the coefficient step shows the modification width that is used each time when the restriction coefficient 2 (i.e., the coefficient 2) is gradually reduced.

Next, a determination is made as to whether or not the restriction coefficient 2 (i.e., the coefficient 2) is equal to or less than a coefficient 2 limit value (step S22). If the restriction coefficient 2 (i.e., the coefficient 2) is equal to or less than the coefficient 2 limit value (i.e., if the determination in step S22 is YES), the restriction coefficient 2 (i.e., the coefficient 2) is taken as the coefficient 2 limit value (step S23). Note that the coefficient 2 limit value is a value showing the limit of the restriction coefficient 2 (i.e., the coefficient 2).

The power holding flag is then set to "1", and the performing control flag is also set to "1" (step S24).

If, however, in step S20, the performing control flag is "0" (i.e., if the determination in step S20 is NO), or if, in step S22, the restriction coefficient 2 (i.e., the coefficient 2) is larger than the coefficient 2 limit value (i.e. if the determination in step S22 is NO), then the routine moves to step S24 without any further action being taken and the power holding flag is set to "1", and the performing control flag is also set to "1" (step S24).

In step S24, once the power holding flag has been set to "1" and the performing control flag has also been set to "1", next, the value of the charging power at this time is temporarily held as the value of the charging power when control of the charging power was started, namely, as the restriction starting power (step S25).

Next, it is determined whether or not the restriction starting power that is currently held is smaller than the previous value (i.e., than the restriction starting power stored at the time of the previous control) (step S26).

If, in step S26, the restriction starting power that is currently held is smaller than the previous value (i.e., if the determination in step S26 is YES), then the stored restriction starting power is updated to the restriction starting power currently held (step S27).

The return delay time is then set to "0" and the regenerative restriction coefficient is set to "1" (step S28).

If, however, in step S26, the restriction starting power that is currently held is equal to or more than the previous value (i.e., if the determination in step S26 is NO), then the routine moves to step S28 without any further action being taken and the return delay time is then set to "0" and the regenerative restriction coefficient is set to "1" (step S28).

Next, the ECU 5 determines whether or not the charging voltage applied to the energy storage device 2 is smaller than a specified voltage 3 (i.e., an upper limit voltage) (step S29).

If, however, in step S19, the power holding flag is "1" (i.e., if the determination in step S19 is YES), the ECU 5 moves to step S29 without taking any further action and determines whether or not the charging voltage applied to the energy storage device 2 is smaller than the specified voltage 3 (i.e., the upper limit voltage) (step S29).

If, in step S29, the charging voltage that is applied to the energy storage device 2 is smaller than the specified voltage 3 (i.e., the upper limit voltage) (i.e., if the determination in step S29 is YES), the ECU 5 determines whether or not the upper limit voltage flag is "0" (step S30). If the upper limit voltage flag is "0" (i.e., if the determination in step S30 is YES), the ECU 5 determines once again whether or not the regenerative restriction coefficient is equal to or less than the coefficient limit value (step S31). Note that the coefficient limit value is a value showing the limit of the regenerative restriction coefficient.

In step S31, if the regenerative restriction coefficient is equal to or less than the coefficient limit value (i.e., if the determination in step S31 is YES), the ECU 5 updates the target power to a value obtained by multiplying the restriction starting power by the coefficient limit value (step S32).

If, however, in step S31, the regenerative restriction coefficient is larger than the coefficient limit value (i.e., if the determination in step S31 is NO), the ECU 5 firstly updates the regenerative restriction coefficient (step S33) to a new regenerative restriction coefficient by subtracting a value obtained by multiplying the restriction coefficient (i.e., the coefficient 1) by the restriction coefficient 2 (i.e., the coefficient 2) from the current regenerative restriction coefficient.

Next, using the updated regenerative restriction coefficient, the target power is updated to a value obtained by multiplying the restriction starting power by the regenerative restriction coefficient (step S34).

As a result, a single charging control operation is ended.

If, however, in step S29, the charging voltage that is applied to the energy storage device 2 is equal to or more than the specified voltage 3 (i.e., the upper limit voltage) (i.e., if the determination in step S29 is NO), the ECU 5 sets the restriction coefficient 3 (i.e., the coefficient 3) to the regenerative restriction coefficient (step S35), and then, using the regenerative restriction coefficient that has been set, updates the target power to a value obtained by multiplying the restriction starting power by the regenerative restriction coefficient (step S36).

The ECU 5 then sets the upper limit voltage flag to "1" (step S37) and a single charging control operation is ended.

If, however, in step S30, the upper limit voltage flag is "1" (i.e., if the determination in step S30 is NO), the ECU 5 ends the single charging control operation without taking any further action.

Note that, in the above description, the specified voltage 1 is a value that is lower by a predetermined value than the specified voltage 2, while the specified voltage 3 is a value that is higher by a predetermined value than the specified voltage 2. The relationships between the respective voltages are such that:

specified voltage 1>specified voltage 2>specified voltage 3.

Next, using FIG. 4, a description will be given of an example of the charging control of the energy storage device 2 by the ECU 5 using the above described flow charts. FIG. 4 shows charging voltages, charging powers, and changes in the respective coefficients when charging control is being performed with time shown by the horizontal axis.

According to FIG. 4, firstly, at the time t1, if the charging voltage (1) that is applied to the energy storage device 2 exceeds the specified voltage 2 (i.e., the restriction determining voltage (2)), the power restriction device of the ECU 5 gradually reduces the regenerative restriction coefficient (6) from the initial value of "1" at a predetermined reduction width.

As a result, the charging power (5) by the PDU 3 is gradually reduced.

Next, at the time t2, if the charging voltage (1) goes below the specified voltage 2 (i.e., the restriction determining voltage (2)) and continues in a state of being greater than the specified voltage 1 (i.e., the restriction removal determining voltage (3)), the ECU 5 monitors variations in the charging voltage (1) while maintaining the regenerative restriction coefficient (6) in the state at the time t2.

Next, at the time t3, if the charging voltage (1) goes below the specified voltage 1 (i.e., the restriction removal determining voltage (3)), the restriction removal device of the ECU 5 gradually increases the regenerative restriction coefficient (6) from the state at the time t2 at an increase width that is smaller than the reduction width employed by the power restriction device.

As a result, the charging power (5) is gradually increased.

Next, at the time t4, if the charging voltage (1) goes above the specified voltage 1 (i.e., the restriction removal determining voltage (3)) and continues in a state of being smaller than the specified voltage 2 (i.e., the restriction determining voltage (2)), the ECU 5 monitors variations in the charging voltage (1) while maintaining the regenerative restriction coefficient (6) in the state at the time t4.

As a result, at the time t5, because the charging voltage (1) has again gone above the specified voltage 2 (i.e., the restriction determining voltage (2)), the power restriction device of the ECU 5 restores the regenerative restriction coefficient (6) to the initial value of "1", and only if the charging power value at this time is smaller than the stored restriction starting power (4) does the upper limit power setting device of the ECU 5 update the stored restriction starting power (4) and further reduce the restriction coefficient 2 (7).

Next, due to the fact that the restriction coefficient 2 (7) has been reduced, the power restriction device of the ECU 5 gradually reduces the regenerative restriction coefficient (6) from the initial value of "1" at a reduction width that is smaller than the reduction width that was used when the charging voltage (1) previously went above the specified voltage 2 (i.e., the restriction determining voltage (2)).

As a result, the charging power (5) is gradually reduced from a value that is smaller than the charging power (5) at the time when the charging voltage first went above the specified voltage 2 (i.e., the restriction determining voltage (2)).

Next, at the time t6, if the charging voltage (1) goes below the specified voltage 2 (i.e., the restriction determining voltage (2)) and continues at a state of being greater than the specified voltage 1 (i.e., the restriction removal determining voltage (3)), the ECU 5 monitors variations in the charging voltage (1) while maintaining the regenerative restriction coefficient (6) in the state at the time t6.

Next, at the time t7, if the charging voltage (1) again goes below the specified voltage 1 (i.e., the restriction removal determining voltage (3)), due to the fact that the restriction coefficient 2 (7) has become smaller at the time t5, the restriction removal device of the ECU 5 gradually increases the regenerative restriction coefficient (6) from the state at the time t7 by an increase width that is smaller than the increase width used when the charging voltage (1) previously went below the specified voltage 1 (i.e., the restriction removal determining voltage (3)).

As a result, the charging power (5) is gradually increased.

Next, at the time t8, if the charging voltage (1) goes above the specified voltage 1 (i.e., the restriction removal determining voltage (3)) and continues at a state of being smaller than the specified voltage 2 (i.e., the restriction determining voltage (2)), the ECU 5 monitors variations in the charging voltage (1) while maintaining the regenerative restriction coefficient (6) in the state at the time t8.

As a result, at the time t9, because the charging voltage (1) has again gone above the specified voltage 2 (i.e., the restriction determining voltage (2)), the power restriction device of the ECU 5 restores the regenerative restriction coefficient (6) to the initial value of "1", and only if the charging power value at this time is smaller than the stored restriction starting power (4) does the upper limit power setting device of the ECU 5 update the stored restriction starting power (4) and further reduce the restriction coefficient 2 (7).

Next, due to the fact that the restriction coefficient 2 (7) has been reduced, the power restriction device of the ECU 5 gradually reduces the regenerative restriction coefficient (6) from the initial value of "1" at a reduction width that is smaller than the reduction width that was used when the charging voltage (1) previously went above the specified voltage 2 (i.e., the restriction determining voltage (2)).

As a result, the charging power (5) is gradually reduced from a value that is even smaller than the charging power (5) at the time when the charging voltage (1) went above the specified voltage 2 (i.e., the restriction determining voltage (2)) the first and second times.

Next, at the time t10, if the charging voltage (1) goes below the specified voltage 2 (i.e., the restriction determining voltage (2)) and continues in a state of being larger than the specified voltage 1 (i.e., the restriction removal determining voltage (3)), the ECU 5 monitors variations in the charging voltage (1) while maintaining the regenerative restriction coefficient (6) in the state at the time t6. Hereafter, the above operations are repeated. Accordingly, by repeating this type of control, as is shown in FIG. 4, after the time t10 the charging power (5) is sufficiently stable. In addition, by controlling the charging power (5), the charging voltage (1) is converged on the specified voltage 2 (i.e., the restriction determining voltage (2)) while being controlled so as not to go above the specified voltage 3 (i.e., the upper limit voltage (8)).

Note that in the present embodiment, the ECU 5 includes an upper limit power setting device, a power restriction device, and a restriction removal device. More specifically, from step S18 in FIG. 2 to step S28 in FIG. 3 corresponds to the upper limit power setting device, from step S29 in FIG. 3 to step S37 corresponds to the power restriction device, and from step S1 in FIG. 2 to step S17 corresponds to the restriction removal device.

As has been described above, in the charging and discharging control apparatus of the present embodiment, during charging control, for example, if the charging voltage that is applied to the energy storage device 2 goes above the restriction determining voltage, the ECU 5 holds the power value at that time as an upper limit value of the charging power (i.e., of the degenerative power) for the PDU 3. In addition, the ECU 5 multiplies the output restriction coefficients by the upper limit value of the charging power while gradually reducing the output restriction coefficients until the charging voltage that is applied to the energy storage device 2 equals or goes below the restriction removal determining voltage, and by controlling the PDU 3 using the result thereof as the control target value of the charging power, the charging power is gradually limited.

In contrast, if the charging voltage that is applied to the energy storage device 2 goes below the restriction removal determining voltage, the ECU 5 conversely multiplies the output restriction coefficients by the upper limit value of the charging power while gradually increasing the output restriction coefficients until the charging voltage that is applied to the energy storage device 2 equals or goes above the restriction determining voltage, and by controlling the PDU 3 using the result thereof as the control target value of the charging power, the charging power is gradually restored to its original state. Note that, if the charging voltage that is applied to the energy storage device 2 once more goes above the restriction determining voltage, the upper limit value of the charging power that is held is reduced each time this happens. In addition the modification width of the output restriction coefficients is made smaller. As a result, it is possible to reduce changes in the control target value that is set, and to encourage convergence of the charging voltage.

Accordingly, constant voltage charging of various energy storage devices 2 having different reactions is possible using restriction determining voltages regardless of the type of energy storage device 2. In addition, it is possible to reduce variations in the torque of the motor 1 to a minimum. Consequently, if the charging and discharging control apparatus of the present embodiment is used in vehicles that travel using a motor such as, for example, electric vehicles (EV) and hybrid electric vehicles (HEV), the effects are obtained that it is possible to effectively recover regenerative energy created by the running of the vehicle, improve fuel consumption, and improve marketability of the vehicle.

(Discharging Control)

Note that, in the flow charts shown in FIG. 2 and FIG. 3, as an example of the charging control and discharging control of the energy storage device 2 by the ECU 5 of the charging and discharging control apparatus of the present embodiment, an explanation is given of charging control of the energy storage device 2 executed by the ECU 5 for the PDU 3 based on the voltage between terminals of the energy storage device 2 that is detected by the voltage sensor 4, however, the discharging of the energy storage device 2 that is executed by the ECU 5 for the PDU 3 can be performed in the same way.

Moreover, in the description of the discharging control that is given below, the voltage between the terminals of the energy storage device 2 that is generated when current is output from the energy storage device 2 is taken as the discharging voltage that is output from the energy storage device 2. In addition, the power from this current and this discharging voltage is treated as a positive power and this taken as the discharging power.

Specifically, when the discharging voltage that is output from the energy storage device 2 goes below the restriction determining voltage, the ECU 5 holds the power value at that time as the upper limit value of the discharging power from the energy storage device 2. In addition, the ECU 5 multiplies the output restriction coefficients by the upper limit value of the discharging power while gradually reducing the output restriction coefficients until the discharging voltage that is output from the energy storage device 2 equals or goes above the restriction removal determining voltage, and by controlling the PDU 3 using the result thereof as the control target value of the discharging power, the discharging power is gradually limited.

In contrast, if the discharging voltage that is output from the energy storage device 2 goes above the restriction removal determining voltage, the ECU 5 conversely multiplies the output restriction coefficients by the upper limit value of the discharging power while gradually increasing the output restriction coefficients until the discharging voltage that is output from the energy storage device 2 equals or goes below the restriction removal determining voltage, and by controlling the PDU 3 using the result thereof as the control target value of the discharging power, the discharging power is gradually restored to its original state. Note that, if the discharging voltage that is output from the energy storage device 2 once more goes below the restriction determining voltage, the upper limit value of the discharging power that is held is reduced each time this happens. In addition the modification width of the output restriction coefficients is made smaller.

Namely, in the flow charts shown in FIG. 2 and FIG. 3, the determination contents in step S1 are modified from "whether or not the charging voltage that is applied to the energy storage device 2 is smaller than the specified voltage 1 (i.e., the restriction removal determining voltage)" to "whether or not the discharging voltage that is output from the energy storage device 2 is greater than the specified voltage 4 (i.e., the restriction removal determining voltage)".

Moreover, the determination contents in step S18 are modified from "whether or not the charging voltage that is applied to the energy storage device 2 is smaller than the specified voltage 2 (i.e., the restriction determining voltage)" to "whether or not the charging voltage that is applied to the energy storage device 2 is greater than the specified voltage 5 (i.e., the restriction determining voltage)".

Furthermore, the determination contents in step S29 are modified from "whether or not the charging voltage that is applied to the energy storage device 2 is smaller than the specified voltage 3 (i.e., the upper limit voltage)" to "whether or not the discharging voltage that is output from the energy storage device 2 is greater than the specified voltage 6 (i.e., the lower limit voltage)".

Moreover, the control ending voltage in step S16 is modified from "a voltage that is higher than an open circuit voltage by the amount of a particular margin and that is specified by adding this margin to the open circuit voltage of the energy storage device 2" to "a voltage that is lower than an absolute upper limit voltage by the amount of a particular margin and that is specified by adding this margin to the absolute upper limit voltage of the energy storage device 2".

Furthermore, the return delay time in step S9 is defined as a time in which the discharging voltage that is output from the energy storage device 2 is above the specified voltage 4 (i.e., the restriction removal determining voltage).

It is also possible for the regenerative restriction coefficient to be switched to a discharge restriction coefficient, and for the upper limit voltage flag to be switched to a lower limit voltage flag.

Accordingly, in the same way as in the charging control, constant voltage discharging of various energy storage devices 2 having different reactions is possible using restriction determining voltages regardless of the type of energy storage device 2. In addition, it is possible to reduce variations in the torque of the motor 1 to a minimum. Consequently, if the charging and discharging control apparatus of the present embodiment is used in vehicles that travel using a motor such as, for example, electric vehicles (EV) and hybrid electric vehicles (HEV), the effect is obtained that it is possible to improve marketability of the vehicle.

As has been described above, according to the charging and discharging control apparatus of the present invention, if the charging voltage that is applied to an energy storage device exceeds a restriction determining voltage that is set in order to start a restriction on the charging power, a voltage restriction device operates a stored upper limit power value and restriction coefficient and controls the load such that the charging voltage is gradually reduced. In contrast, if the charging voltage that is applied to an energy storage device goes below a restriction removal determining voltage that is set in order to remove a restriction on the charging power, a restriction removal device operates a stored upper limit power value and restriction coefficient and controls the load such that the charging voltage is gradually increased at a slower speed than that of the reduction.

Accordingly, if the charging voltage that is applied to an energy storage device exceeds a restriction determining voltage, the charging power is promptly limited and the charging voltage is reduced at a suitable speed. If the charging voltage drops too much, the charging power is restored at a slower speed than when it dropped, enabling the convergence of the charging voltage to be accelerated. Because of this, constant voltage charging of various energy storage devices having different reactions is possible using restriction determining voltages regardless of the type of energy storage device. In addition, because it is possible to stabilize power transfers between the energy storage device and a connected load, the effect is achieved that characteristic variations in the load can be restricted. Moreover, with the load taken, for example, as an inverter and motor, then if the charging and discharging control apparatus of the present invention is used in a vehicle that runs using this motor, the effects are achieved that the regenerative energy created when the vehicle runs can be effectively recovered, an improvement in fuel efficiency can be obtained, and the marketability of the vehicle can be improved.

In addition, in the case of discharging control, in the same way as in the charging control, if the discharging voltage that is output from an energy storage device drops below a restriction determining voltage, the discharging power is promptly limited and the discharging voltage is increased at a suitable speed. If the discharging voltage increases too much, the discharging power is restored at a slower speed than when it rose, enabling the convergence of the discharging voltage to be accelerated. Because of this, constant voltage discharging of various energy storage devices having different reactions is possible using restriction determining voltages regardless of the type of energy storage device. In addition, because it is possible to stabilize power transfers between the energy storage device and a connected load, the effect is achieved that characteristic variations in the load can be restricted. As a result, if the charging and discharging control apparatus of the present invention is used in a vehicle that, in the same way, runs using a motor, the effect is achieved that the marketability of the vehicle can be improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A charging and discharging control apparatus that controls charging and discharging of an energy storage device by a load that is connected to the energy storage device, comprising:

an upper limit power setting device that, when a charging voltage that is applied to the energy storage device exceeds a restriction determining voltage that is set in order to start a restriction of charging power to the energy storage device, sets a charging power value at that point as an upper limit power value for the charging power;

a power restricting device that multiplies a restriction coefficient by the upper limit power value while gradually reducing the restriction coefficient using a predetermined reduction width until the charging voltage drops below the restriction determining voltage, and, by setting a result thereof in the load as a control target value of the charging power, restricts the charging power; and a restriction removal device that, when the charging voltage drops below a restriction removal determining voltage that is set in order to remove a restriction on the charging power, multiplies the restriction coefficient by the upper limit power value while gradually increasing the restriction coefficient using a predetermined increase width, and, by setting a result thereof in the load as a control target value of the charging power, removes the restriction on the charging power, wherein the reduction width of the restriction coefficient in the power restricting device is set to be larger than the increase width of the restriction coefficient in the restriction removal device.

2. The charging and discharging control apparatus according to claim 1, wherein, if the charging voltage again exceeds the restriction determining voltage, the upper limit power setting device updates the upper limit power value if the charging power value at this time is smaller than the upper limit power value that is stored.

3. The charging and discharging control apparatus according to claim 1, wherein, if the charging voltage again exceeds the restriction determining voltage, the power restricting device makes the reduction width of the restriction coefficient that is set at this time smaller than the reduction width of the restriction coefficient that was set when the charging voltage previously exceeded the restriction determining voltage.

4. The charging and discharging control apparatus according to claim 1, wherein if the charging voltage again drops below the restriction removal determining voltage, the restriction removal device makes the increase width of the restriction coefficient that is set at this time smaller than the increase width of the restriction coefficient that was set when the charging voltage previously dropped below the restriction removal determining voltage.

5. A charging and discharging control apparatus that controls charging and discharging of an energy storage device by a load that is connected to the energy storage device, comprising:

an upper limit power setting device that, when a discharging voltage that is output from the energy storage device drops below a restriction determining voltage that is set in order to start a restriction of discharging power from the energy storage device, sets a discharging power value at that point as an upper limit power value for the discharging power;

a power restricting device that multiplies a restriction coefficient by the upper limit power value while gradually reducing the restriction coefficient using a predetermined reduction width until the discharging voltage goes above the restriction determining voltage, and, by setting a result thereof in the load as a control target value of the discharging power, restricts the discharging power; and a restriction removal device that, when the discharging voltage goes above a restriction removal determining voltage that is set in order to remove a restriction on the discharging power, multiplies the restriction coefficient by the upper limit power value while gradually increasing the restriction coefficient using a predetermined increase width, and, by setting a result thereof in the load as a control target value of the discharging power, removes the restriction on the discharging power, wherein the reduction width of the restriction coefficient in the power restricting device is set to be larger than the increase width of the restriction coefficient in the restriction removal device.

6. The charging and discharging control apparatus according to claim 5, wherein, if the discharging voltage again drops below the restriction determining voltage, the upper limit power setting device updates the upper limit power value if the discharging power value at this time is smaller than the upper limit power value that is stored.

7. The charging and discharging control apparatus according to claim 5, wherein, if the discharging voltage again drops below the restriction determining voltage, the power restricting device makes the reduction width of the restriction coefficient that is set at this time smaller than the reduction width of the restriction coefficient that was set when the discharging voltage previously dropped below the restriction determining voltage.

8. The charging and discharging control apparatus according to claim 5, wherein if the discharging voltage again exceeds the restriction removal determining voltage, the restriction removal device makes the increase width of the restriction coefficient that is set at this time smaller than the increase width of the restriction coefficient that was set when the discharging voltage previously exceeded the restriction removal determining voltage.

9. A charging and discharging control method for controlling charging and discharging of an energy storage device by a load that is connected to the energy storage device, comprising:

upper limit power setting processing in which, when a charging voltage that is applied to the energy storage device exceeds a restriction determining voltage that is set in order to start a restriction of charging power to the energy storage device, a charging power value at that point is set as an upper limit power value for the charging power;

power restricting processing in which a restriction coefficient is multiplied by the upper limit power value while the restriction coefficient is gradually reduced using a predetermined reduction width until the charging voltage drops below the restriction determining voltage, and a result thereof is set in the load as a control target value of the charging power, so as to restrict the charging power; and restriction removal processing in which, when the charging voltage drops below a restriction removal determining voltage that is set in order to remove a restriction on the charging power, the restriction coefficient is multiplied by the upper limit power value while the restriction coefficient is gradually increased using a predetermined increase width, and a result thereof is set in the load as a control target value of the charging power, so as to remove the restriction on the charging power, wherein the reduction width of the restriction coefficient in the power restricting processing is set to be larger than the increase width of the restriction coefficient in the restriction removal processing.

10. A charging and discharging control method for controlling charging and discharging of an energy storage device by a load that is connected to the energy storage device, comprising:

upper limit power setting processing in which, when a discharging voltage that is output from the energy storage device drops below a restriction determining voltage that is set in order to start a restriction of discharging power from the energy storage device, a discharging power value at that point is set as an upper limit power value for the discharging power;

power restricting processing in which a restriction coefficient is multiplied by the upper limit power value while the restriction coefficient is gradually reduced using a predetermined reduction width until the discharging voltage goes above the restriction determining voltage, and a result thereof is set in the load as a control target value of the discharging power, so as to restrict the discharging power; and restriction removal processing in which, when the discharging voltage goes above a restriction removal determining voltage that is set in order to remove a restriction on the discharging power, the restriction coefficient is multiplied by the upper limit power value while the restriction coefficient is gradually increased using a predetermined increase width, and a result thereof is set in the load as a control target value of the discharging power, so as to remove the restriction on the discharging power, wherein the reduction width of the restriction coefficient in the power restricting processing is set to be larger than the increase width of the restriction coefficient in the restriction removal processing.

* * * * *